United States Patent
Tsunoda et al.

(10) Patent No.: US 7,434,830 B2
(45) Date of Patent: Oct. 14, 2008

(54) RIDER RESTRAINING DEVICE FOR TWO WHEEL VEHICLE

(75) Inventors: Kazuhiko Tsunoda, Saitama (JP); Norihiro Kurata, Saitama (JP); Yutaka Murata, Saitama (JP); Takashi Ogino, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 375 days.

(21) Appl. No.: 11/221,783

(22) Filed: Sep. 9, 2005

(65) Prior Publication Data

US 2006/0056943 A1 Mar. 16, 2006

(30) Foreign Application Priority Data

Sep. 10, 2004 (JP) ............... 2004-263803

(51) Int. Cl.
*B60R 21/20* (2006.01)
*B60R 21/16* (2006.01)

(52) U.S. Cl. .............. 280/730.1; 280/728.1; 280/728.2; 280/731

(58) Field of Classification Search .............. 280/728.1, 280/728.2, 730.1, 731; 180/219
See application file for complete search history.

(56) References Cited

U.S. PATENT DOCUMENTS

| | | | | |
|---|---|---|---|---|
| 5,967,545 | A * | 10/1999 | Iijima et al. | 280/730.1 |
| 7,264,270 | B2 * | 9/2007 | Miyata et al. | 280/743.2 |
| 2003/0132616 | A1 * | 7/2003 | Yanagibashi et al. | 280/730.1 |
| 2004/0017066 | A1 * | 1/2004 | Kuroe et al. | 280/730.1 |
| 2004/0077184 | A1 | 4/2004 | Anderson et al. | |
| 2004/0207182 | A1 * | 10/2004 | Miyata | 280/730.1 |
| 2004/0207185 | A1 * | 10/2004 | Miyata | 280/730.1 |
| 2004/0207189 | A1 | 10/2004 | Miyata | |

FOREIGN PATENT DOCUMENTS

| | | |
|---|---|---|
| DE | 29917343 U1 | 2/2000 |
| EP | 0342653 A2 | 11/1989 |
| JP | 2000-31430 A | 1/2000 |
| JP | 2000-31432 A | 1/2000 |
| JP | 2000-44731 A | 2/2000 |
| JP | 2003-11871 A | 1/2003 |
| JP | 2003-261081 A | 9/2003 |
| JP | 2003-285787 A | 10/2003 |

\* cited by examiner

*Primary Examiner*—Christopher Ellis
*Assistant Examiner*—Jacob Meyer
(74) *Attorney, Agent, or Firm*—Birch, Stewart, Kolasch & Birch, LLP.

(57) ABSTRACT

An air-bag type rider restraining device for a two wheel vehicle having a scooter structure. A stay is firmly fixed by welding to a front portion of a head pipe. A connection member is fastened with two nuts onto the stay. An air bag supporting frame is connected and fixed to the connection member at its lower end so as to be directed rearwardly and obliquely upwardly along a handle pipe. The air bag supporting frame positions and fixes an air bag unit so as to be directed to a chest position of a rider above a center portion of a steering handle. A ring-like frame structure as an air bag holding member is disposed round a surface of the air bag unit facing the rider wherein a forward load applied to the air bag by holding the inflated air bag from behind is received by the ring-like frame structure.

20 Claims, 4 Drawing Sheets

RIDER RESTRAINING DEVICE FOR TWO WHEEL VEHICLE

CROSS-REFERENCE TO RELATED APPLICATIONS

The present application claims priority under 35 USC 119 to Japanese Patent Application No. 2004-263803 filed on Sep. 10, 2004 the entire contents of which are hereby incorporated by reference.

FIELD OF THE INVENTION

The present invention relates to a rider restraining device for a two wheel vehicle. More specifically, to a rider restraining device for a two wheel vehicle for restraining the movement of a rider towards a front of a vehicle body.

DESCRIPTION OF BACKGROUND ART

Japanese Patent Laid-Open No. 2003-285787 and Japanese Patent Laid-Open No. 2003-261081 disclose technologies for inflating an air bag, which is activated by detecting an impact, in front of a rider in order to restrain the movement of the rider toward a front of a vehicle body due to impact while operating a two wheel vehicle.

Japanese Patent Laid-Open No. 2003-285787 discloses a technology wherein an air bag unit is disposed between a front end portion of a fuel tank and a meter panel. The unit is supported by a main frame of a large two wheel vehicle with a structure in which the fuel tank and a rider's seat are arranged in line and the fuel tank is held by a knee grip. Japanese Patent Laid-Open No. 2003-261081 discloses a technology wherein an air bag unit is installed below a front of a rider's seat in a two wheel vehicle having a structure in which a fuel tank and the rider's seat are similarly arranged in line and the fuel tank is held by a knee grip.

The technology of Japanese Patent Laid-Open No. 2003-285787 is intended for a two wheel vehicle having a structure in which a fuel tank is held by a knee grip. As described above, the two wheel vehicle has a main frame which extends towards a rear of a vehicle body from an upper end portion of a handle pipe and supports the fuel tank and the rider's seat. Thus, it is possible to dispose the air bag unit between the front end portion of the fuel tank and the meter panel, and to support the unit by the main frame. However, in a two wheel vehicle having a scooter structure, a main frame is bent downwardly in a U-shape in order to secure a wide footrest space. Thus, it is difficult to support an air bag unit by the main frame.

In the technology of Japanese Patent Laid-Open No. 2003-261081, since the air bag unit is disposed below the front of the rider seat, the rider seat is configured so as to have its front lifted up when the air bag is inflated. However, in the two wheel vehicle having the scooter structure, a rider is seated with his/her knees closed, thus making it difficult to have a structure in which the front of the rider seat is lifted up.

SUMMARY AND OBJECTS OF THE INVENTION

It is an object of the present invention to solve the problems of the conventional technologies described above and to provide an air-bag type rider restraining device which is easily applied to a two wheel vehicle having a scooter structure.

In order to achieve the foregoing object, the present invention includes a means in a rider movement restraining device which restrains movement of a rider of a two wheel vehicle toward a front of a vehicle body.

A rider restraining device, for restraining the movement of a rider of a two wheel vehicle towards a front of a vehicle body includes a steering handle, a handle post which supports a center portion of the steering handle so as to be flexibly steerable and an air bag unit which is supported by the handle post so as to be directed to a chest position of the rider above the center portion of the steering handle.

The rider restraining device further includes an air bag supporting post which is connected to and supported by the handle post and extends upwardly along the handle post. In the device, the air bag unit is provided in an upper part of the air bag supporting post.

The rider restraining device further includes an air bag holding member which is provided around a surface of the air bag unit facing the rider, and receives a forward load applied to an inflated air bag.

The air bag holding member is a frame structure which is formed by bending a frame member into a ring shape, and has the ring-like part disposed so as to face the rider.

The air bag holding member has a nearly planar shape extending to an outer side of a front face of the air bag unit facing the rider.

According to an embodiment of the present invention, since the air bag unit is supported by the handle post, the air bag unit can be disposed in a proper position even in a two wheel vehicle having a scooter structure which does not include a frame extending rearwardly from the vicinity of an upper end portion of the handle post.

According to an embodiment of the present invention, the air bag unit is supported not directly but indirectly by the handle post through the air bag supporting post. Thus, even if it is difficult to support the air bag unit directly by the handle post, the air bag can be supported so as to be directed to the chest position of the rider above the center portion of the steering handle.

According to an embodiment of the present invention, the forward load applied to the inflated air bag can be properly received by the air bag holding member.

According to an embodiment of the present invention, since the air bag holding member is formed of the frame structure, a weight increase caused by adding the air bag holding member can be minimized.

According to an embodiment of the present invention, since the air bag holding member is formed to have a nearly planar shape, a load applied to the air bag can be dispersed and received.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
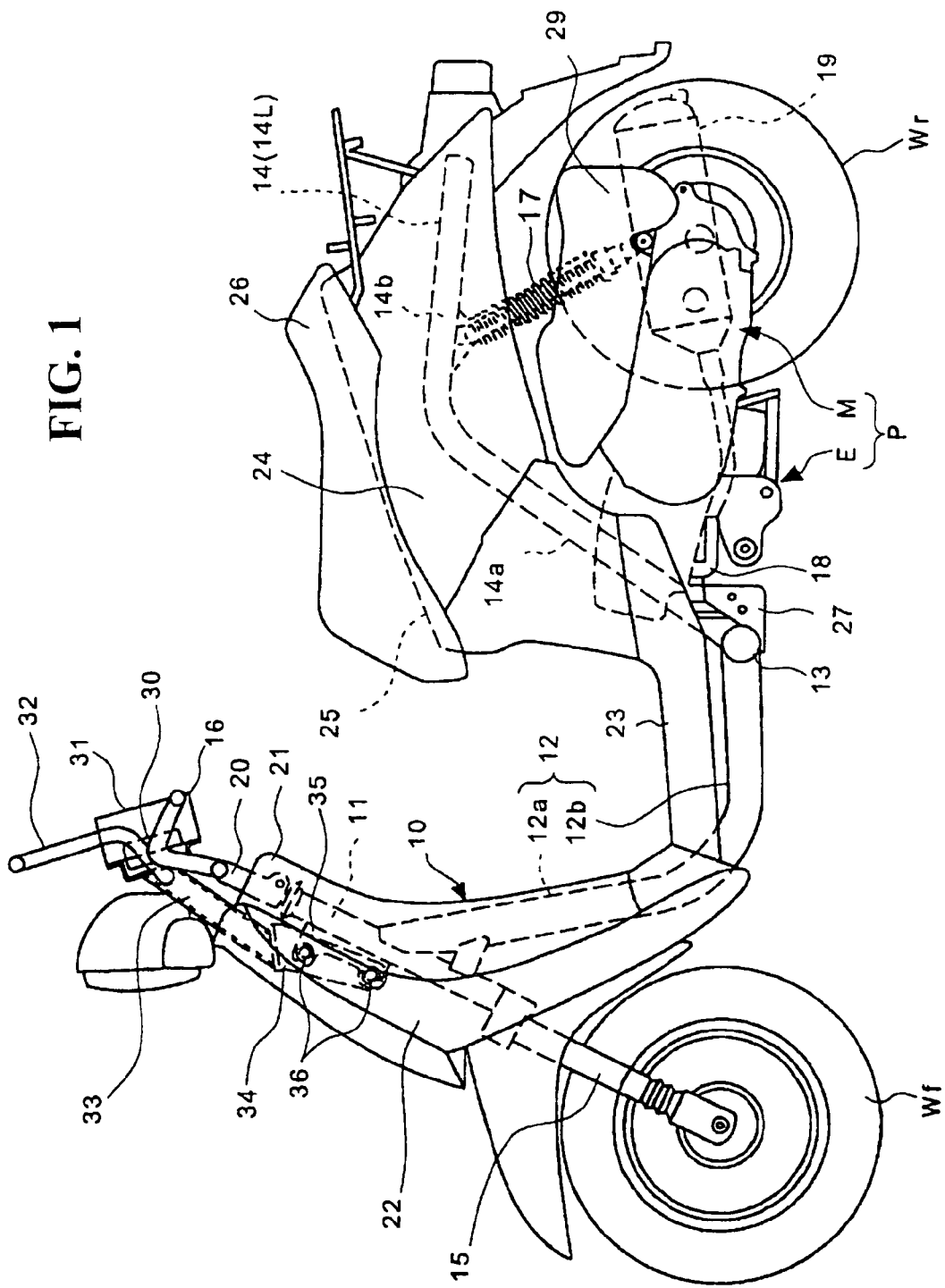
FIG. 1 is a side view of a scooter type two wheel vehicle to which a rider restraining device of the present invention is applied.

With reference to the drawings, embodiments of the present invention will be described in detail below. FIG. 1 is a side view of a scooter type two wheel vehicle to which a rider restraining device of the present invention is applied. A vehicle body frame 10 mainly includes a main frame pipe 12 having a head pipe 11 fixed to its front end portion, a cross pipe 13 fixed perpendicularly and horizontally to a rear end portion of the main frame pipe 12 and a pair of left and right rear frame pipes 14 (14L and 14R) which have their front ends connected to both ends of the cross pipe 13, respectively.

The main frame pipe 12 is formed by integrating a down frame part 12a tilted rearwardly and downwardly from the head pipe 11 with a lower frame part 12b extending approximately horizontally rearwardly from a rear end of the down frame part 12a. The cross pipe 13 extends in left and right directions of the vehicle body frame 10 with the rear end portion of the main frame pipe 12 being fixed perpendicularly to a center portion of the cross pipe 13. The pair of left and right rear frame pipes 14 are formed by integrating rise frame parts 14a extending rearwardly and upwardly from both ends of the cross pipe 13 with upper frame parts 14b extending approximately horizontally rearwardly from rear ends of the rise frame parts 14a and being curved within a horizontal plane so as to have rear end openings that face each other.

A front fork 15 for supporting a front wheel Wf is supported by the head pipe 11 so as to be flexibly steerable. A steering handle 16 is connected to an upper end of the front fork 15 through a handle pipe 20. In front portions of the rear frame pipes 14, a power unit P is supported so as to be swingable in an up-and-down direction. More specifically, the power unit P includes an engine E disposed in front of a rear wheel Wr and a stepless transmission M disposed on the left side of the rear wheel Wr. The rear wheel Wr is pivotally supported by a rear portion of the power unit P. An air cleaner 29 is disposed on the left side of an upper portion of the rear wheel Wr.

A rear suspension unit 17 is provided between the rear portion of the power unit P and the left rear frame pipe 14L. An exhaust pipe 18 for guiding exhaust gas from the engine E extends to the right side of the rear wheel Wr from the engine E. The exhaust pipe 18 is connected to an exhaust muffler 19 disposed on the right side of the rear wheel Wr. Between the front portions of the left and right rear frame pipes 14, a storage box 25 is supported so as to be disposed above the engine E.

The vehicle body frame 10 is covered with a vehicle body cover 21 made of synthetic resin. The vehicle body cover 21 includes a leg shield 22 which covers the front of the legs of the rider, a step floor 23 which is connected to a lower portion of the leg shield 22 so as to allow the rider to put his/her feet thereon and a side cover 24 which is connected to the step floor 23 and covers a rear part of the vehicle body from both sides thereof.

The storage box 25 and a fuel tank (not shown) are covered with the side cover 24. A seat 26 for covering the storage box 25 from above is attached to an upper part of the side cover 24 so as to be openable and closable. More specifically, the step floor 23 is formed in the vehicle body cover 21 so as to be disposed between the steering handle 16 and the seat 26. A frame side bracket 27 is disposed below a rear end of the step floor 23 for supporting the power unit P on the vehicle body frame 10 so as to be swingable.

Figure 2:
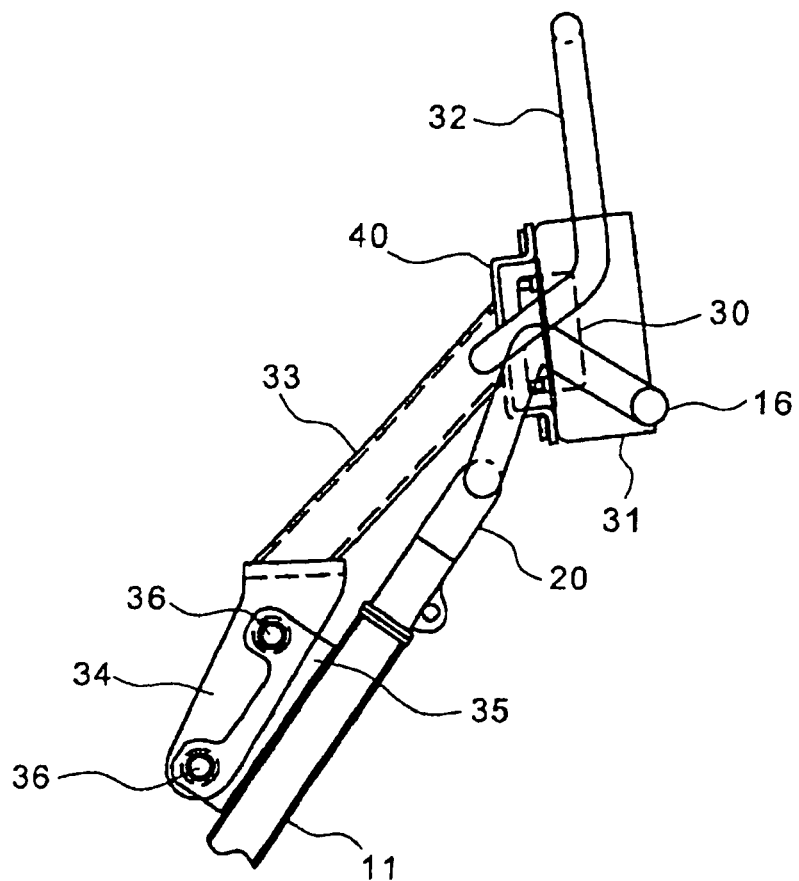
FIG. 2 is a side view of a first embodiment of a structure which supports an air bag.

With reference to FIG. 2, a stay 35 is firmly fixed by welding to a front portion of the head pipe 11. A connection member 34 is fastened with two nuts 36 onto the stay 35. An air bag supporting frame 33 is connected and fixed to the connection member 34 at its lower end so as to be directed rearwardly and obliquely upwardly along the handle pipe 20. More specifically, the air bag supporting frame 33 positions and fixes an air bag unit 31 so as to be directed to a chest position of the rider above a center portion of the steering handle 16.

Figure 3:
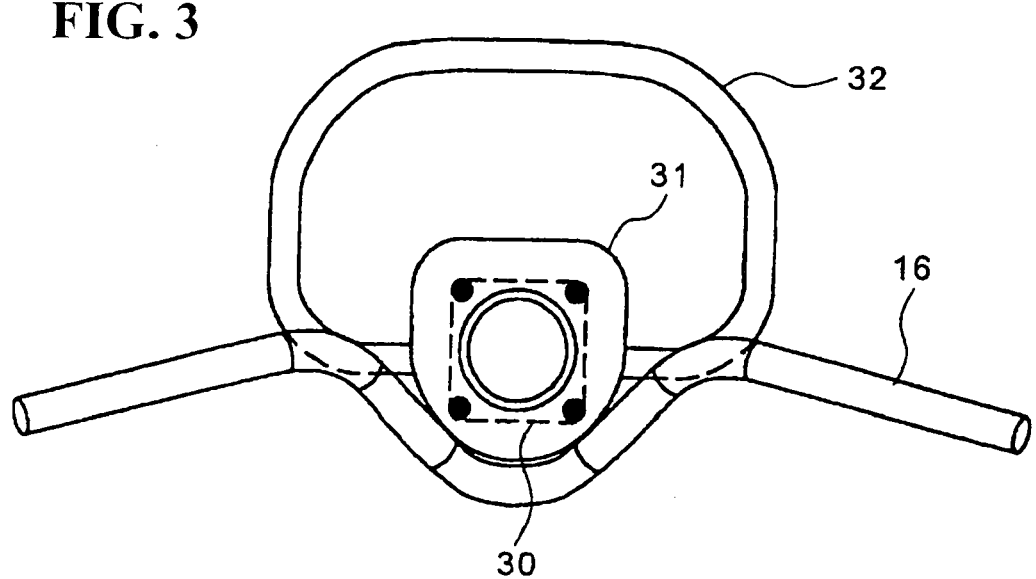
FIG. 3 is a view of an air bag installation position of the first embodiment, as seen through the rider's eyes.

With reference to FIG. 3, the air bag unit 31 is mounted on an upper end portion of the air bag supporting frame 33 by means of a stay 40. In the air bag unit 31, an air bag (not shown) is housed in a folded state and an inflator 30 is installed for generating gas to inflate the air bag. A ring-like frame structure 32 is disposed round a surface of the air bag unit 31 facing the rider as an air bag holding member which receives a forward load applied to the air bag by holding the inflated air bag from behind. The ring-like frame structure 32 is formed by bending a bar-like frame member into a ring shape and is inserted into and fixed to the vicinity of the upper end portion of the air bag supporting frame 33.

Figure 4:
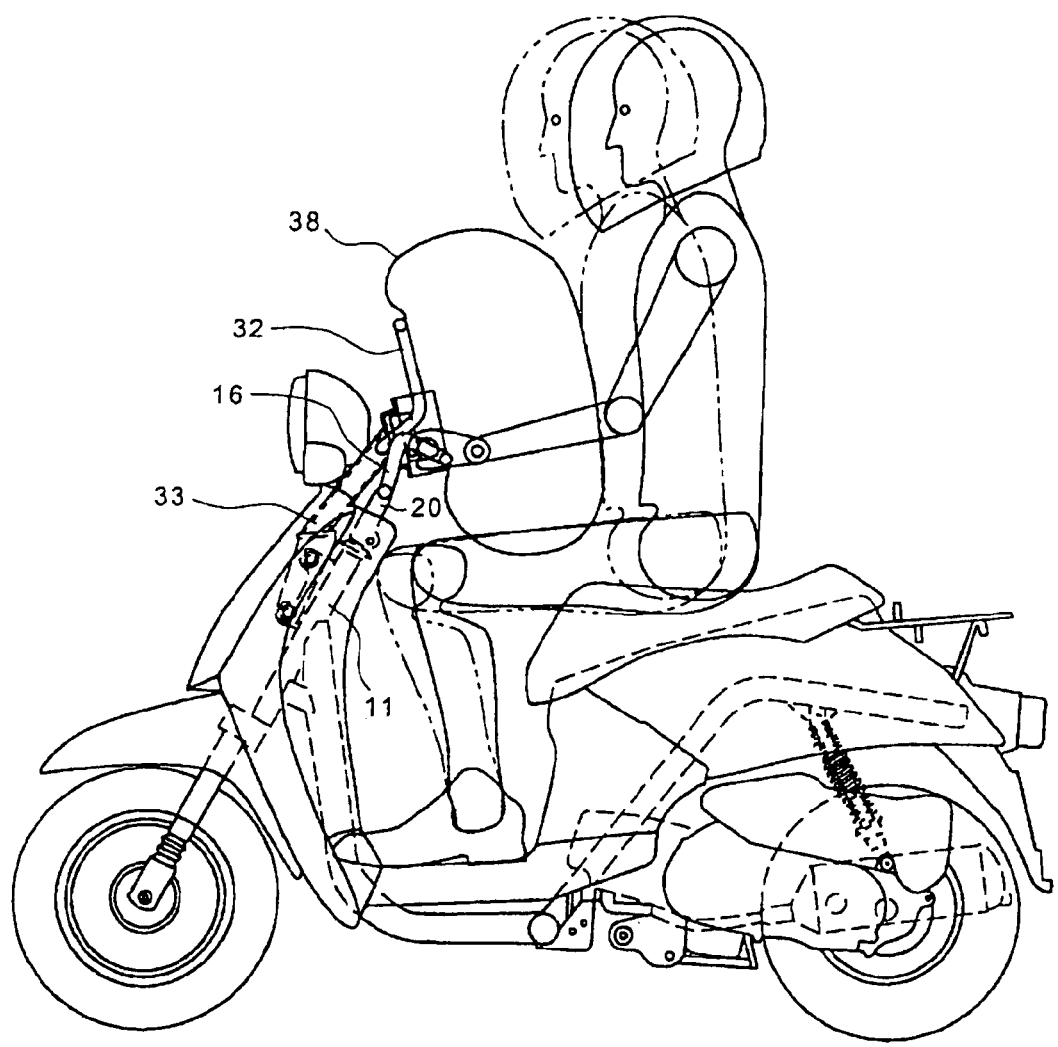
FIG. 4 is a side view showing a state wherein the air bag is inflated.

In the configuration as described above, as shown in FIG. 4, when an impact is applied to a vehicle and the inflator 30 is activated, an air bag 38 is inflated. Accordingly, the rider forced to move forward is received by the air bag 38. In this event, the air bag 38 is supported by the ring-like frame structure 32 from behind. The forward load applied to the air bag 38 can be properly received.

Moreover, in this embodiment, a reduction in weight is realized by employing the frame structure 32 as the air bag holding member. Thus, a weight increase caused by adding the air bag holding member can be minimized.

Figure 5:
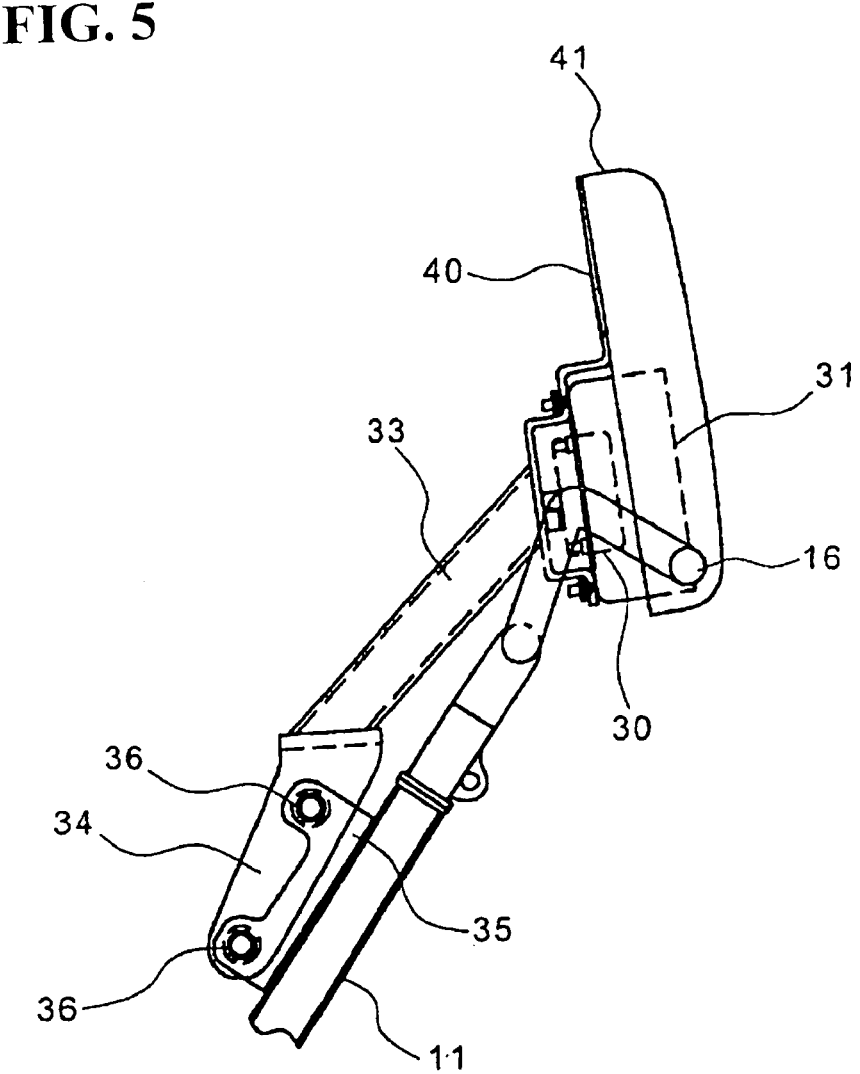
FIG. 5 is a side view of a second embodiment of a structure for supporting an air bag.
Figure 6:
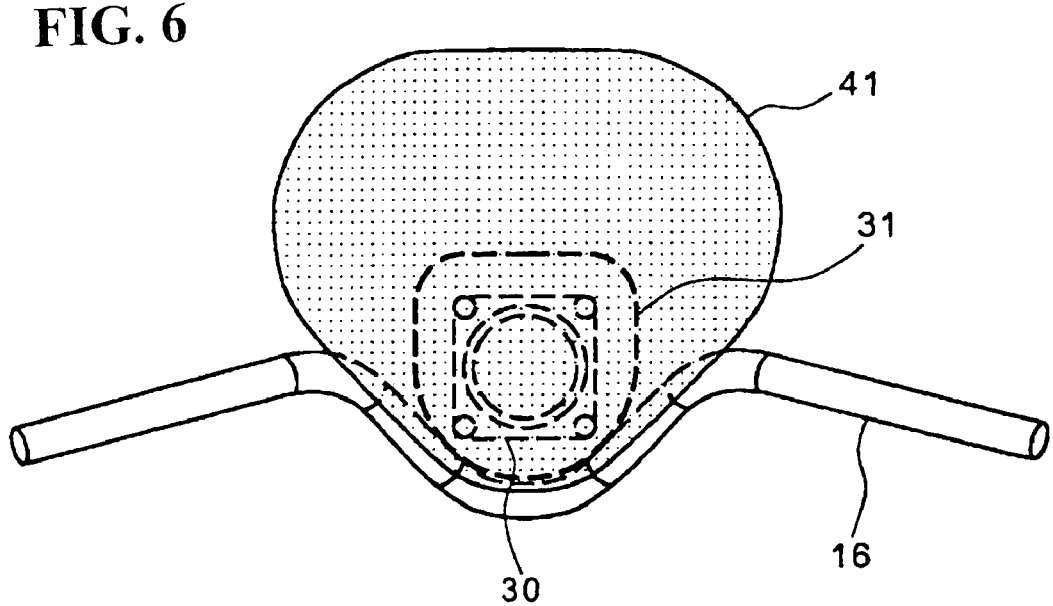
FIG. 6 is a view of an air bag installation position of the second embodiment, as seen through the rider's eyes.

FIG. 5 is a side view of a rider restraining device for a two wheel vehicle according to a second embodiment of the present invention. FIG. 6 is a front view of FIG. 5. In FIGS. 5 and 6, the same reference numerals as those described above denote the same or equivalent components.

In this embodiment, as the air bag holding member, a planar body 41 is employed, which extends to an outer side of a front face of the air bag unit 31 facing the rider. Inside the planar body 41, the air bag unit 31 is housed.

According to this embodiment, the forward load applied to the inflated air bag 38 is received on a plane. Thus, compared to the first embodiment described above, the load applied to the air bag holding member can be dispersed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rider restraining device for a two wheel vehicle for restraining movement of a rider of a two wheel vehicle towards a front of a vehicle body, comprising:

a steering handle;

a handle post for supporting a center portion of the steering handle so as to be steerable; and an airbag unit including an airbag and an inflator, an entirety of which is supported by the handle post in a non-steerable position above an upper end of the handle post so as to be directed to a chest position of the rider above the center portion of the steering handle.

2. The rider restraining device for a two wheel vehicle according to claim 1, and further including an air bag supporting post connected to and supported by the handle post and extending upwardly along the handle post, wherein the air bag unit is provided in an upper portion of the air bag supporting post.

3. The rider restraining device for a two wheel vehicle according to claim 1, and further including an air bag holding member mounted in a fixed position above the upper end of the handle post so as to be provided around a surface of the air bag unit facing the rider for receiving a forward load, which is applied to an inflated air bag, behind the air bag.

4. The rider restraining device for a two wheel vehicle according to claim 2, and further including an air bag holding member provided around a surface of the air bag unit facing the rider for receiving a forward load, which is applied to an inflated air bag, behind the air bag.

5. The rider restraining device for a two wheel vehicle according to claim 1, wherein an air bag holding member is a frame structure formed by bending a frame member into a ring shape, the ring shape of the air bag holding member disposed so as to face the rider.

6. The rider restraining device for a two wheel vehicle according to claim 2, wherein an air bag holding member is a frame structure formed by bending a frame member into a ring shape, the ring shape the ring shape of the air bag holding member disposed so as to face the rider.

7. The rider restraining device for a two wheel vehicle according to claim 3, wherein the air bag holding member is a frame structure formed by bending a frame member into a ring shape, the ring shape the ring shape of the air bag holding member disposed so as to face the rider.

8. The rider restraining device for a two wheel vehicle according to claim 1, wherein an air bag holding member is mounted in a fixed position above the upper end of the handle post and has a nearly planar shape extending to an outer side of a front face of the air bag unit facing the rider.

9. The rider restraining device for a two wheel vehicle according to claim 2, wherein an air bag holding member has a nearly planar shape extending to an outer side of a front face of the air bag unit facing the rider.

10. The rider restraining device for a two wheel vehicle according to claim 3, wherein the air bag holding member has a nearly planar shape extending to an outer side of a front face of the air bag unit facing the rider.

11. A rider restraining device for a two wheel vehicle for restraining movement of a rider of a two wheel vehicle towards a front of a vehicle body, comprising:

a handle post;

an airbag unit including an airbag and an inflator, an entirety of which is supported by the handle post in a non-steerable position above an upper end of the handle post so as to be directed to a chest position of the rider above the center portion of the steering handle; and an air bag holding member operatively positioned relative to said handle post and said air bag unit for preventing forward movement of the air bag when deployed.

12. The rider restraining device for a two wheel vehicle according to claim 11, and further including an air bag supporting post connected to and supported by the handle post and extending upwardly along the handle post, wherein the air bag unit is provided in an upper portion of the air bag supporting post.

13. The rider restraining device for a two wheel vehicle according to claim 11, wherein said air bag holding member mounted in a fixed position above the upper end of the handle post so as to be is provided around a surface of the air bag unit facing the rider for receiving a forward load, which is applied to an inflated air bag, behind the air bag.

14. The rider restraining device for a two wheel vehicle according to claim 12, wherein said air bag holding member is provided around a surface of the air hag unit facing the rider for receiving a forward load, which is applied to an inflated air bag, behind the air bag.

15. The rider restraining device for a two wheel vehicle according to claim 11, wherein the air bag holding member is a frame structure formed by bending a frame member into a ring shape, the ring shape of the air bag holding member disposed so as to face the rider.

16. The rider restraining device for a two wheel vehicle according to claim 12, wherein the air bag holding member is a flame structure formed by bending a frame member into a ring shape, the ring shape of the air bag holding member disposed so as to face the rider.

17. The rider restraining device for a two wheel vehicle according to claim 13, wherein the air bag holding member is a frame structure formed by bending a frame member into a ring shape, the ring shape of the air bag holding member disposed so as to face the rider.

18. The rider restraining device for a two wheel vehicle according to claim 11, wherein the air bag holding member is mounted in a fixed position above the upper end of the handle post and has a nearly planar shape extending to an outer side of a front face of the air bag unit facing the rider.

19. The rider restraining device for a two wheel vehicle according to claim 12, wherein the air bag holding member has a nearly planar shape extending to an outer side of a front face of the air bag unit facing the rider.

20. The rider restraining device for a two wheel vehicle according to claim 13, wherein the air bag holding member has a nearly planar shape extending to an outer side of a front face of the air bag unit facing the rider.

* * * * *